United States Patent Office 2,847,455
Patented Aug. 12, 1958

2,847,455

12-CARBOXYAMIDO-11 OR 12-OCTADECENOIC ACIDS AND ESTERS THEREOF

Thomas R. Steadman, Waban, and John O. H. Peterson, Jr., Burlington, Mass., assignors to National Research Corporation, Cambridge, Mass., a corporation of Massachusetts No Drawing. Application April 2, 1957
Serial No. 650,065

5 Claims. (Cl. 260—482)

This invention relates to the production of chemicals and in particular to the production of novel acids.

A principal object of the present invention is to prepare the new chemical compounds, 12-carboxy-11-octadecenoic acid and 12-carboxy-12-octadecenoic acid.

Another object of the present invention is to illustrate the preparation of the new chemical compounds, 12-carboxamido-11-octadecenoic acid and 12-carboxamido-12-octadecenoic acid and the corresponding esters thereof.

Other objects of the invention will in part be obvious and will in part appear hereinafter.

The invention accordingly comprises the new chemical compounds and compositions of matter possessing the features and properties which are exemplified in the following detailed disclosure, and the scope of the application of which will be indicated in the claims.

For a fuller understanding of the nature and objects of the invention, reference should be had to the following detailed disclosure.

The present invention is directed to novel unsaturated acid-amides, and the production of novel unsaturated dibasic acids therefrom. The acid-amides are useful as chemical intermediates and as components of resin compositions. These amides are preferably prepared by reacting 12-cyano-12-hydroxystearic acid or an ester thereof with a mineral acid at temperatures which will effect a hydrolysis of the cyanohydrin, followed by dehydration thereof. The esters, particularly the methyl ester of 12-cyano-12-hydroxystearic acid, are prefered since they are generally liquids. The 12-cyano-12-hydroxystearic acid or the esters thereof may be prepared in the manner illustrated in copending application Serial No. 579,713, filed April 23, 1956, now U. S. Patent No. 2,830,065.

The amides which can be obtained from 12-cyano-12-hydroxystearic acid are 12-carboxamido-12-octadecenoic acid and 12-carboxamido-11-octadecenoic acid. When an ester of 12-cyano-12-hydroxystearic acid is employed there are also obtained the corresponding esters of the unsaturated acid-amide. For example, there is obtained from the methyl ester, methyl 12-carboxamido-12-octadecenoate, methyl 12-carboxamido-11-octadecenoate, 12-carboxamido-12-octadecenoic acid and 12-carboxamido-11-octadecenoic acid.

The dibasic acids obtained from the above unsaturated acid-amides are 12-carboxy-11-octadecenoic acid and 12-carboxy-12-octadecenoic acid. These acids are prepared by heating a mixture of the above carboxamido compounds with an alkali metal hydroxide. These acids have been found to be particularly useful in the production of polyesters for the manufacture of plastics and paint resins.

One specific detailed method of producing the above acids is set forth in the following non-limiting examples.

*Example I*

To 188.7 grams of 72.5 percent pure methyl 12-cyano-12-hydroxystearate in a flask, 190 mls. of concentrated sulfuric acid (98 percent) were added dropwise over a 30 minute period. During the addition the reaction temperature was not allowed to exceed 70° C. Upon completion of the addition, the reaction mixture was heated rapidly to 125° C. and then added to 1000 grams of ice. The recovered solid product amounted to 162.6 grams and was identified as a mixture of 12-carboxamido-11-octadecenoic acid, 12-carboxamido-12-octadecenoic acid and the corresponding methyl esters. The product had an unsaturation value of $2.74 \times 10^{-3}$ equivalents per gram, corresponding to 90.5 percent of the theoretical value based on the initial cyanohydrin.

*Example II*

147.7 grams of a mixture of 12-carboxamido-11-octadecenoic acid, 12-carboxamido-12-octadecenoic acid and the corresponding methyl esters, 105 grams of sodium hydroxide, 210 grams of water and 210 grams of diethylene glycol were heated at reflux until the evolution of ammonia ceased. The reaction mixture then was acidified and there was separated 117.9 grams of a 90 percent pure mixture of 12-carboxy-11-octadecenoic acid and 12-carboxy-12-octadecenoic acid. This material was further purified by distillation as the ethyl ester. Elemental analysis and an unsaturation value showed that the distilled ester was essentially pure material.

*Example III*

15 grams of a 90 percent pure mixture of 12-carboxy-11-octadecenoic acid and 12-carboxy-12-octadecenoic acid in acetic acid solution was hydrogenated in the presence of Adams' catalyst. The recovered product, recrystallized from a 2 percent solution of water in acetic acid, was 98.8 percent pure 2-hexyltridecanedioic acid as shown by neutral equivalent and elemental analysis.

The reaction of Examples I and II can be represented by the following equations:

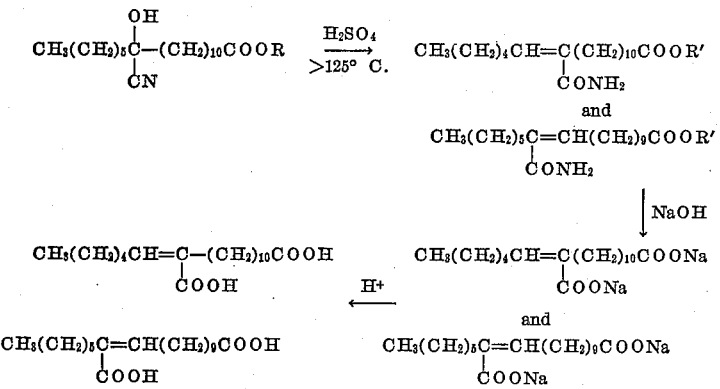

where R and R' may be a hydrogen, methyl, ethyl or like group. When R corresponds to hydrogen, then R' also represents a hydrogen group. When R represents an alkyl group such as methyl, then R' may represent a hydrogen or an alkyl group.

When a 12-cyano-12-hydroxystearate is employed, as the starting material, then under the present reaction conditions, only part of the carboxyalkyl (e. g., carboxymethyl) groups may be hydrolyzed. Heating the product with a dilute aqueous solution of a mineral acid, such as hydrochloric., sulfuric, nitric, phosphoric or like acids, results in complete hydrolysis of the carboxyalkyl groups without hydrolyzing the amide groups. The conversion of 12-cyano-12-hydroxystearic acid and esters thereof to unsaturated acid-amides takes place when aqueous solutions of mineral acids such as shown above are employed. Mineral acids with concentrations of above 50 percent and particularly above 80 percent are preferable for the hydrolysis of the cyano group. The preferred acid is sulfuric.

The temperatures employed for the conversion of the 12-cyano-12-hydroxystearic acid and/or esters thereof to unsaturated acid-amides are those which favor hydrolysis of the cyanohydrin and dehydration of the resulting hydroxy compounds. The hydrolysis of the cyanohydrin is accomplished at temperatures below about 120° C. as illustrated in copending application Serial No. 628,483, filed December 17, 1956, now U. S. Patent No. 2,830,077. However, substantially complete dehydration of the resulting hydroxy compounds takes place at temperatures above about 120° C.

The dibasic acids are prepared by heating a mixture of 12-carboxamido-11-octadecenoic acid and 12-carboxamido-12-octadecenoic acid, or an ester thereof such as the methyl ester, with an alkali metal hydroxide. In addition to the use of sodium hydroxide, aqueous solutions of potassium hydroxide are also applicable. Aqueous solutions with an alkali metal hydroxide concentration of between about 5 percent and 50 percent by weight are quite suitable.

The reaction between the unsaturated acid-amides or unsaturated ester-amides and alkali metal hydroxide must be carried out at a temperature above 100° C., since at temperatures below 100° C. no appreciable reaction or ammonia evolution is noticed. The reaction mixture is maintained at this elevated temperature until the evolution of ammonia therefrom has ceased.

Upon completion of this latter reaction, the dibasic acids are present as alkali metal salts. The free acids can be recovered from their salts by treatment with a suitable mineral acid such as hydrochloric acid, nitric acid, phosphoric acid, sulfuric acid and the like. Both the unsaturated amides and the unsaturated acids absorb hydrogen in acetic acid solutions in the presence of Adams' catalyst to give the following saturated derivatives:

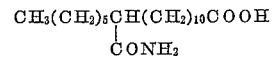

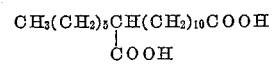

The 2-hexyltridecanedioic acid produced is useful as plasticizers or as a component in isocyanate cross-linked resins. Simple esters of this acid can be used as synthetic lubricants.

Since certain changes may be made in the above chemical compounds and process without departing from the scope of the invention herein involved, it is intended that all matter contained in the above description shall be interpreted as illustrative and not in a limiting sense.

What is claimed is:

1. The chemical compounds of the general formula

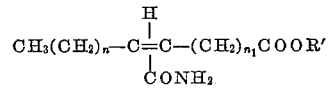

where R' is selected from the group consisting of hydrogen and lower alkyl groups, $n$ is a whole number of from 4 to 5, $n_1$ is a whole number of from 9 to 10, and where when $n$ is 4, $n_1$ is 10 and when $n$ is 5, $n_1$ is 9, the —$CONH_2$ group in each instance being attached to the 12 carbon atom.

2. The chemical compound, 12-carboxamido-11-octadecenoic acid.

3. The chemical compound, 12-carboxamido-12-octadecenoic acid.

4. A new composition of matter consisting of a mixture of 12-carboxamido-11-octadecenoic acid and 12-carboxamido-12-octadecenoic acid.

5. A new composition of matter consisting of a mixture of 12-carboxamido-11-octadecenoic acid, 12-carboxamido-12-octadecenoic acid and the methyl esters thereof.

References Cited in the file of this patent

Beilstein, 4 Auflage, 2 Band, page 800 (1920).